US008676493B2

(12) United States Patent
M et al.

(10) Patent No.: US 8,676,493 B2

(45) Date of Patent: Mar. 18, 2014

(54) SYSTEMS AND METHODS FOR BETTER ALARM MANAGEMENT

(75) Inventors: Deepak Sundar M, Bangalore (IN); Arunkumar Kamalakannan, Chennai (IN)

(73) Assignee: Honeywell International Inc., Morristown, NJ (US)

(*) Notice: Subject to any disclaimer, the term of this patent is extended or adjusted under 35 U.S.C. 154(b) by 410 days.

(21) Appl. No.: 12/627,691

(22) Filed: Nov. 30, 2009

(65) Prior Publication Data

US 2011/0130957 A1 Jun. 2, 2011

(51) Int. Cl.
*G01C 21/20* (2006.01)
*G01C 21/00* (2006.01)

(52) U.S. Cl.
USPC .......... 701/410; 701/434

(58) Field of Classification Search
USPC .......... 701/408–410, 433–434; 340/524–525, 340/541
See application file for complete search history.

(56) References Cited

U.S. PATENT DOCUMENTS

2004/0113777 A1* 6/2004 Matsuhira et al. ............ 340/541
2006/0228010 A1* 10/2006 Rubbert et al. ............... 382/128
2006/0247849 A1* 11/2006 Mohsini et al. ............... 701/206
2007/0001904 A1* 1/2007 Mendelson .................. 342/450
2007/0032945 A1 2/2007 Kaufman
2007/0039030 A1 2/2007 Romanowich et al.
2007/0044033 A1* 2/2007 Larsen ......................... 715/765
2007/0257986 A1* 11/2007 Ivanov et al. ................ 348/154
2008/0009969 A1* 1/2008 Bruemmer et al. ........... 700/245
2008/0252448 A1 10/2008 Agarwalla et al.
2008/0294487 A1* 11/2008 Nasser ............................ 705/8
2008/0303901 A1* 12/2008 Variyath et al. ............... 348/143
2010/0023250 A1* 1/2010 Mays et al. ................... 701/201

OTHER PUBLICATIONS

Brickhouse Security—Mega-Pixel 32 Channel NVR Surveillance Software.
CyeWeb—Best intelligent video surveillance. webcam. camera. cctv security. dvr surveillance software system; http://www.novosun.com/Online_Manual/en-US/CyeWeb/Modules.aspx Chapter 4: Modules.

* cited by examiner

*Primary Examiner* — Jason Holloway
(74) *Attorney, Agent, or Firm* — Husch Blackwell LLP

(57) ABSTRACT

A system and method of better alarm management is provided. The method includes importing a floor map of a monitored area onto a workstation, configuring the floor map, and generating an optimal guidance route map on the floor map. The optimal guidance route map provides a user with at least one route from the workstation to a designated device in the monitored area.

18 Claims, 7 Drawing Sheets

NOTE: BASED ON THE CALIBRATION DATA THE DISTANCE BETWEEN THE DEVICE AND WORKSTATION IS CALCULATED

SYSTEMS AND METHODS FOR BETTER ALARM MANAGEMENT

FIELD OF INVENTION

The present invention relates generally to video management systems. More particularly, the present invention relates to systems and methods for better alarm management in a video management system by generating an optimal guidance route map.

BACKGROUND

Video management systems (VMS) known in the art include a plurality of cameras dispersed in a monitored area and a workstation for monitoring video associated with the plurality of cameras. Each camera can monitor a particular zone in the monitored area. When an alarm or event condition is detected by any particular camera in the area, the video management system can provide an indication at the workstation that the alarm or event condition was detected.

Once an alarm or event condition is detected, an operator or user at the workstation can send or inform security personnel to visit the zone in which the alarm or event condition was detected. Security personnel can investigate the alarm or event condition and/or any suspicious activity occurring in the monitored zone.

In video management systems, each of the plurality of cameras is given a camera name and has a particular location. Often the number of cameras included in a video management system is so numerous that it is difficult, if not impossible, for an operator to remember the name of each camera and the location monitored by each camera. Accordingly, an operator will often access a table or other cross-referencing device to determine the particular location of a camera when that camera detects an alarm or event condition. This can be a tedious and time consuming task for an operator, especially when an alarm condition has been detected and time is of the essence.

There is thus a continuing, ongoing need for systems and methods to expedite the response time of an operator or security personnel when an alarm or event condition has been detected. Preferably, such systems and methods generate an optimal guidance route map for security personnel to follow when moving from a workstation to a zone in which the alarm or event condition is detected.

DESCRIPTION OF THE PREFERRED EMBODIMENTS

Figure 1:
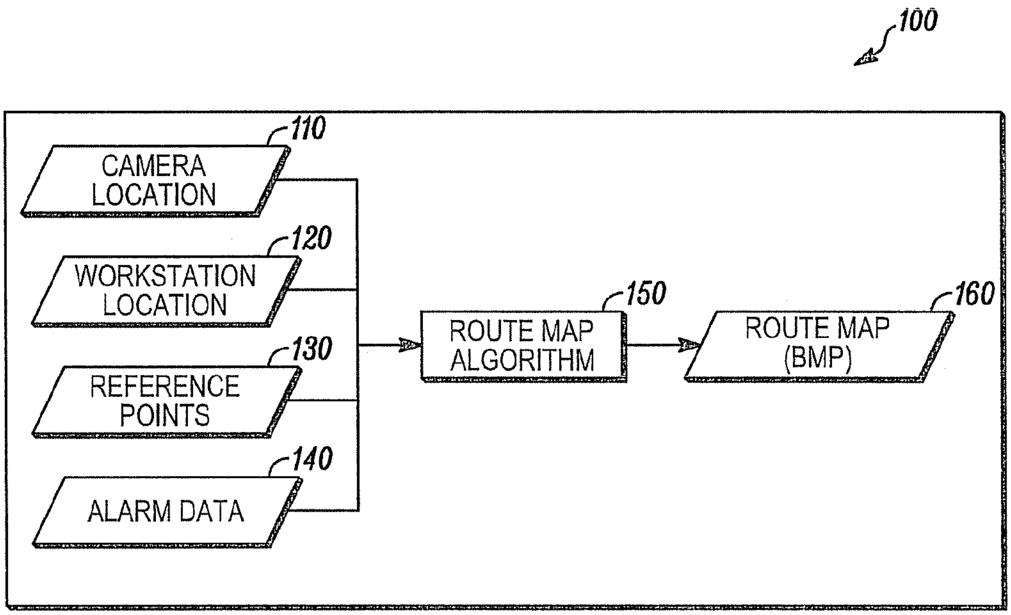
FIG. 1 is a block diagram of a system in accordance with the present invention.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include systems and methods to expedite the response time of an operator or security personnel when an alarm or event condition has been detected. Preferably, such systems and methods generate an optimal guidance route map for security personnel to follow when moving from a workstation to a zone in which the alarm or event condition is detected.

Systems and methods in accordance with the present invention can include a plurality of alarm originating devices dispersed in a monitored area and a workstation for monitoring the plurality of alarm originating devices. In embodiments of the present invention, at least some of the alarm originating devices can be cameras, recorders (DVR/NVR), switchers, or I/O devices known in the art. The present invention will be shown and described herein with reference to cameras. However, it is to be understood that the alarm originating devices in accordance with the present invention are not so limited.

The workstation in accordance with the present invention can include control circuitry, a programmable processor, and associated software, stored on a local computer readable medium, as would be understood by those of skill in the art. In embodiments of the present invention, the workstation can display video associated with each of the cameras in the monitored area and a floor map of the monitored area.

In accordance with the present invention, a floor map of the monitored area can be imported or loaded onto the workstation. In embodiments of the present invention, the floor map can be a picture, graphical representation, or CAD diagram of the monitored area.

Once imported or loaded onto the workstation, systems and methods in accordance with the present invention can configure the floor map. For example, systems and methods of the present invention can identify workstations, cameras, and virtual reference points on the floor map. The virtual reference points can be arbitrary points on the floor map identified by the workstation for location and route calculation.

In systems and method of the present invention, location data for the virtual reference points is computed. That is, the distance between each reference point along paths normally accessible to a user are computed and saved. Then, the optimal path or route from each workstation to each camera on the floor map can be computed using the virtual reference points' location data. The optimal path or route to each camera will vary from workstation to workstation, if multiple workstations are present in the monitored area.

For example, systems and methods of the present invention can use the distances between each reference point to determine the distance between a workstation and a camera via a plurality of different routes. When an alarm or event condition is detected in a particular zone monitored by a particular camera, systems and methods of the present invention can present an operator with the shortest route(s) available for moving from a workstation to the camera in alarm and/or to the zone in which alarm or event condition was detected.

In accordance with the present invention, the optimal paths or routes generated on the floor map provide a detailed route for reaching a particular zone in the monitored area, for example, a zone in which an alarm or event triggering device is located. Systems and methods of the present invention can generate maps with different optimal paths or routes on a need-basis according to alarm priority.

In some embodiments of the present invention, a floor map can be generated with optimal paths and zones even when an alarm condition is not detected. For example, an operator may wish to know an optimal path from his/her workstation to a particular camera for maintenance purposes.

In further embodiments of the present invention, the generated route map can provide an option to contact or call a site supervisor, operator, or security personnel.

FIG. 1 is a block diagram of a system 100 in accordance with the present invention. As seen in FIG. 1, location data of a plurality of cameras located in a monitored area 110, location data of a workstation(s) located in the monitored area 120, location data of the virtual reference points on the floor map 130, and alarm data 140 are used by a route map algorithm 150 to generate an optimal guidance route map 160 in accordance with the present invention. The optimal guidance route map 160 can include depictions of the shortest route(s) available for moving from a workstation to a camera in the zone in which alarm was detected.

Figure 2:
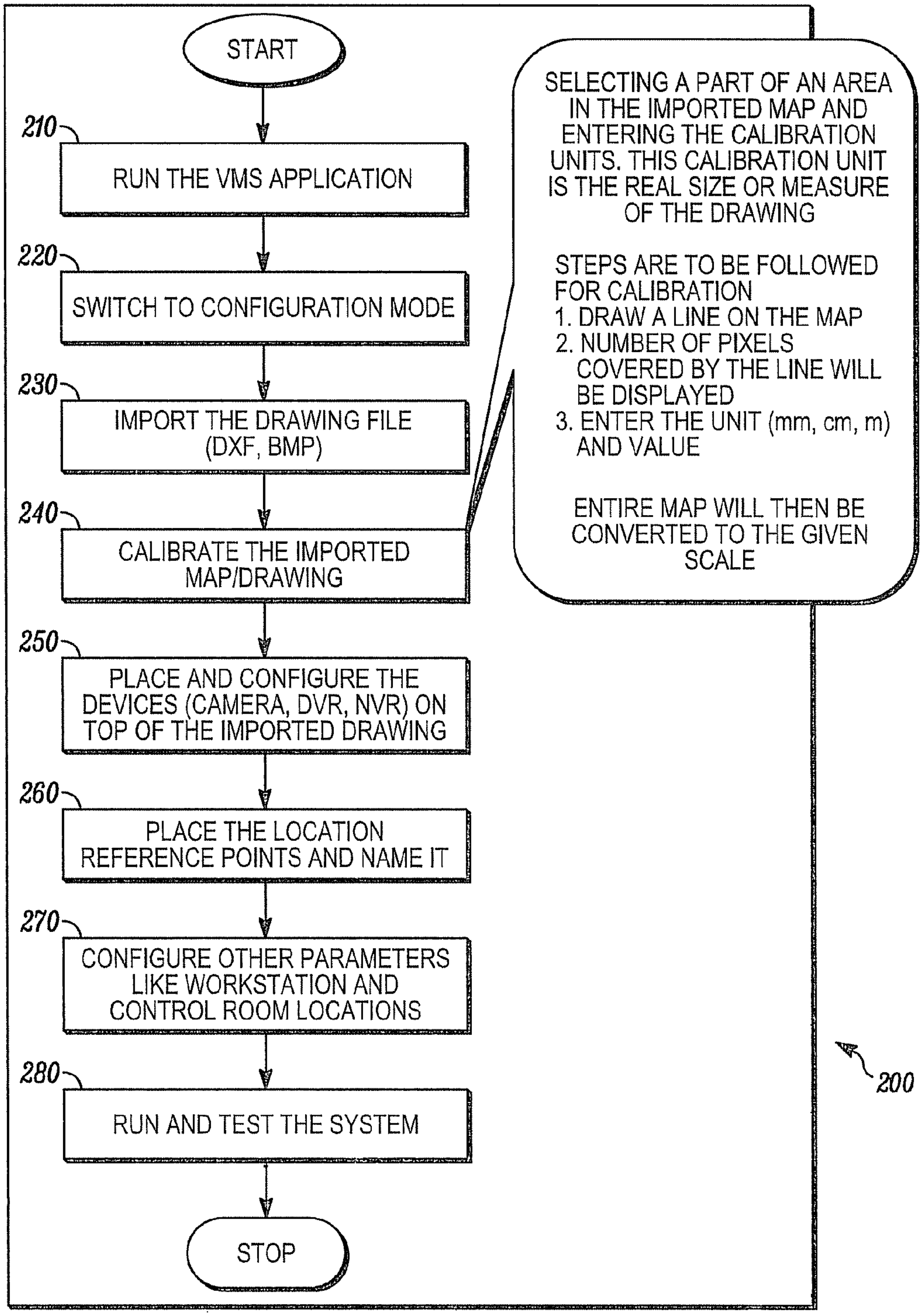
FIG. 2 is a flow diagram of a method of configuring a workstation in accordance with the present invention.
Figure 3:
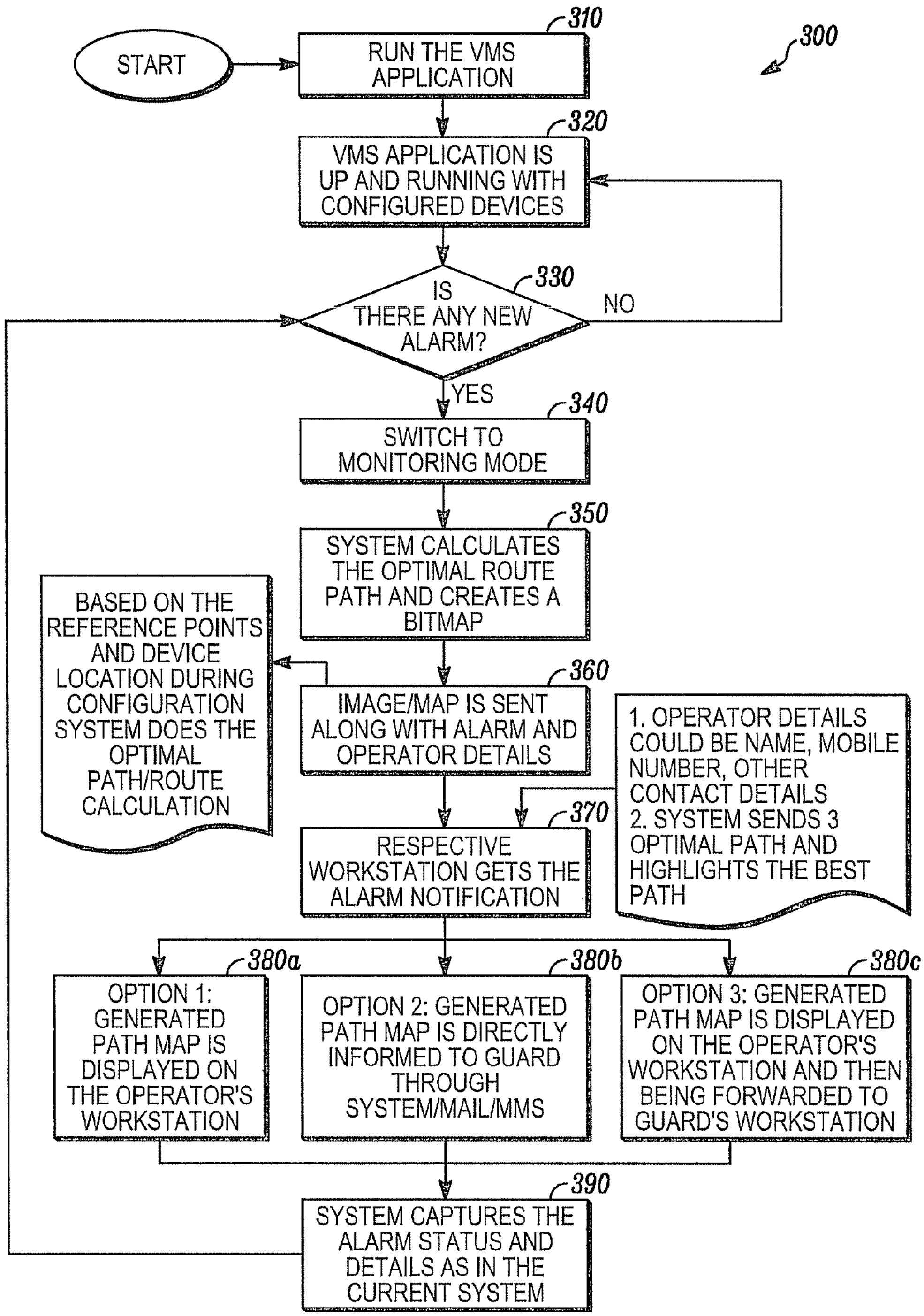
FIG. 3 is a flow diagram of a method of monitoring an area in accordance with the present invention.

Systems and methods of the present invention include a configuration mode and a monitoring mode. In the configuration mode, systems and methods of the present invention configure the cameras and devices on an imported floor map. In the monitoring mode, systems and methods of the present invention generate optimal guidance route maps for displaying on a workstation. FIG. 2 is a flow diagram of a method 200 of configuring a workstation in accordance with the present invention, and FIG. 3 is a flow diagram of a method 300 of monitoring an area in accordance with the present invention.

In the method 200, a video management system application can be run as in 210. Then, the system can be switched to configuration mode as in 220. Once in configuration mode, a floor map of a monitored area can be imported or loaded into or onto an application, for example, a workstation, as in 230. In embodiments of the present invention, the floor map can be a picture, drawing, graphical representation, or CAD drawing of the monitored area.

The imported floor map can be calibrated as in 240. Alternatively, a selected portion of the floor map can be calibrated in 240. When calibrating the floor map, the calibration unit can be entered into or onto the application, for example, the workstation (e.g. meter, millimeter, centimeter, etc.). The calibration unit can be the actual size or measurement of the floor map.

The location of the camera(s) in the monitored area can be identified on the floor map as in 250, the location of virtual reference points can be identified on the floor map as in 260, and the location of the workstation(s) or control room(s) in the monitored area can be identified on the floor map as in 270.

When calibrating the floor map, an operator can draw a line between any of the known points on the floor map. For example, the drawn line can cover a window, door, or pillar on the floor map. The system can then display the number of pixels covered by the drawn line, and the number of pixels can be converted into a distance according to the entered calibration unit.

After the drawn line is converted from pixels to distance, according to calibration unit, the entire map can be converted into distance, according to the calibration unit. Systems and methods of the present invention can use the drawn line conversion from pixels to distance to scale the entire floor map accordingly. Accordingly, the entire floor map can display distances according to the entered calibration unit.

Once the floor map has been configured according to the method 200 described above, an operator can run and test the system as in 280.

In the method 300, a video management system application can be run as in 310. Then, the video management system can be run with a configured floor map as in 320. Once the system is running with a configured floor map, each of the cameras can be monitored for the detection of an alarm condition as in 330.

If no camera in the monitored area detects a new alarm, the system according to the present invention can continue running with the configured floor map as in 320. However, if any camera in the monitored area detects a new alarm, the system can be switched to the monitoring mode as in 340.

Once in the monitoring mode, the system can calculate the optimal path(s) from each workstation to the camera that detected the alarm as in 350. The location of the workstation(s), the camera in alarm, and the virtual reference points can be used to calculate the optimal path(s). An image or map of the calculated optimal paths can be generated and sent to the workstation(s) as in 360.

Details of the detected alarm and operator details can be sent to the workstation(s) with the generated optimal guidance route map. For example, the name, mobile phone number, and contact details for operators on site can be sent to each workstation.

The workstation(s) can receive notification that an alarm condition has been detected as in 370, and the camera in alarm can be so indicated on the floor map at each workstation. The optimal guidance route map with the calculated optimal path(s) can be communicated to an operator as needed.

For example, the optimal guidance route map can be displayed at an operator's workstation as in 380*a*. Additionally or conversely, the optimal guidance route map can be displayed to a guard or security personnel in the monitored area via email or a multimedia messaging service as in 380*b*. The optimal guidance route map can also be displayed at an operator's workstation and then forwarded to the workstation of security personnel in the monitored area as in 380*c*.

After the optimal guidance route map has been displayed as desired, each of the cameras can continue to be monitored for the detection of an alarm condition as in 330.

Figure 4:
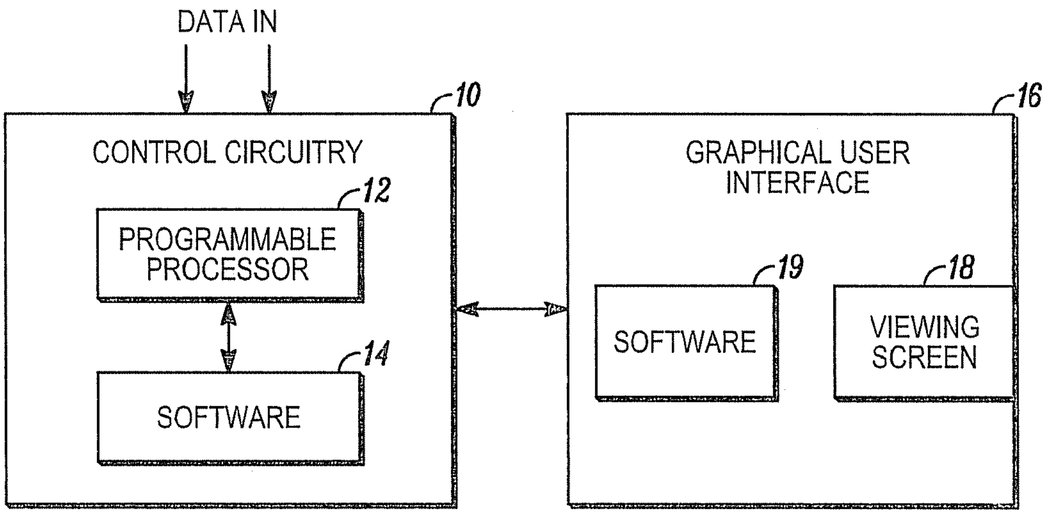
FIG. 4 is a block diagram of a system for carrying out the methods of FIG. 2 and FIG. 3 in accordance with the present invention.

The methods shown in FIG. 2 and FIG. 3 and others in accordance with the present invention can be implemented with a programmable processor and associated control circuitry. As seen in FIG. 4, control circuitry 10 can include a programmable processor 12 and software 14, stored on a local computer readable medium, as would be understood by those of skill in the art. Location data for the plurality of cameras located in a monitored area, location data of a workstation(s) located in the monitored area, location data of the virtual reference points, and any alarm data can be input into the programmable processor and associated control circuitry.

An associated user interface 16 can be in communication with the processor 12 and circuitry 10. A viewing screen 18 of the user interface, as would be known by those of skill in the art, can display interactive and viewing windows. In some embodiments of the present invention, the user interface can be a multi-dimensional graphical user interface. In some embodiments of the present invention, the viewing screen 18 can display video from the cameras in the monitored area.

The interactive and viewing windows shown and described herein are exemplary only. Those of skill in the art will understand that the features of the windows shown and described herein may be displayed by additional or alternate windows.

Figure 5:
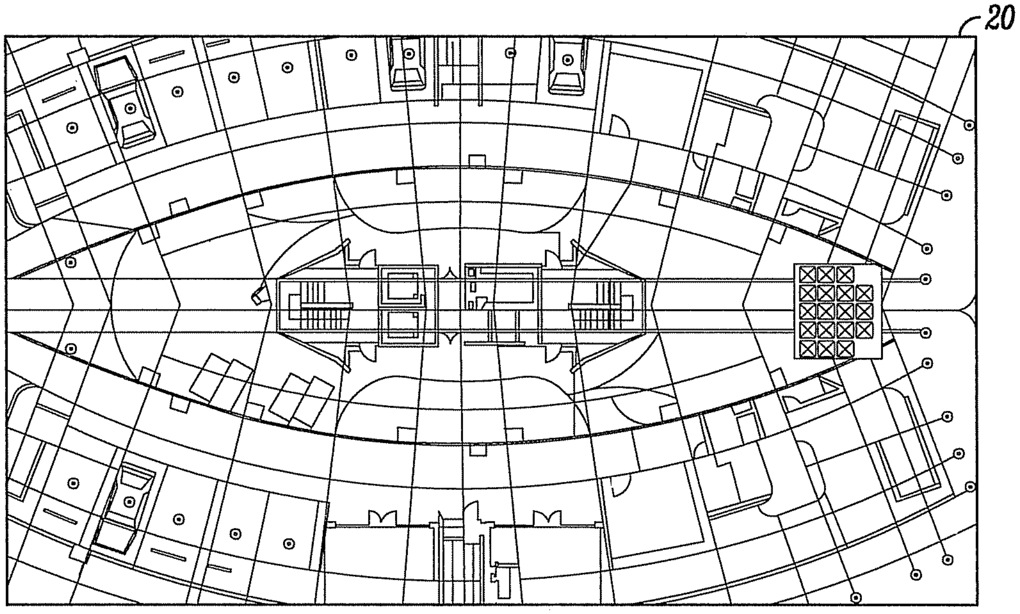
FIG. 5 is an interactive window displayed on a viewing screen of a graphical user interface for displaying a floor map in accordance with the present invention.

FIG. 5 is an interactive window 20 displayed on a viewing screen of a graphical user interface for displaying a floor map in accordance with the present invention. The floor map can be a picture, drawing, graphical representation, or CAD drawing of a monitored area.

Figure 6:
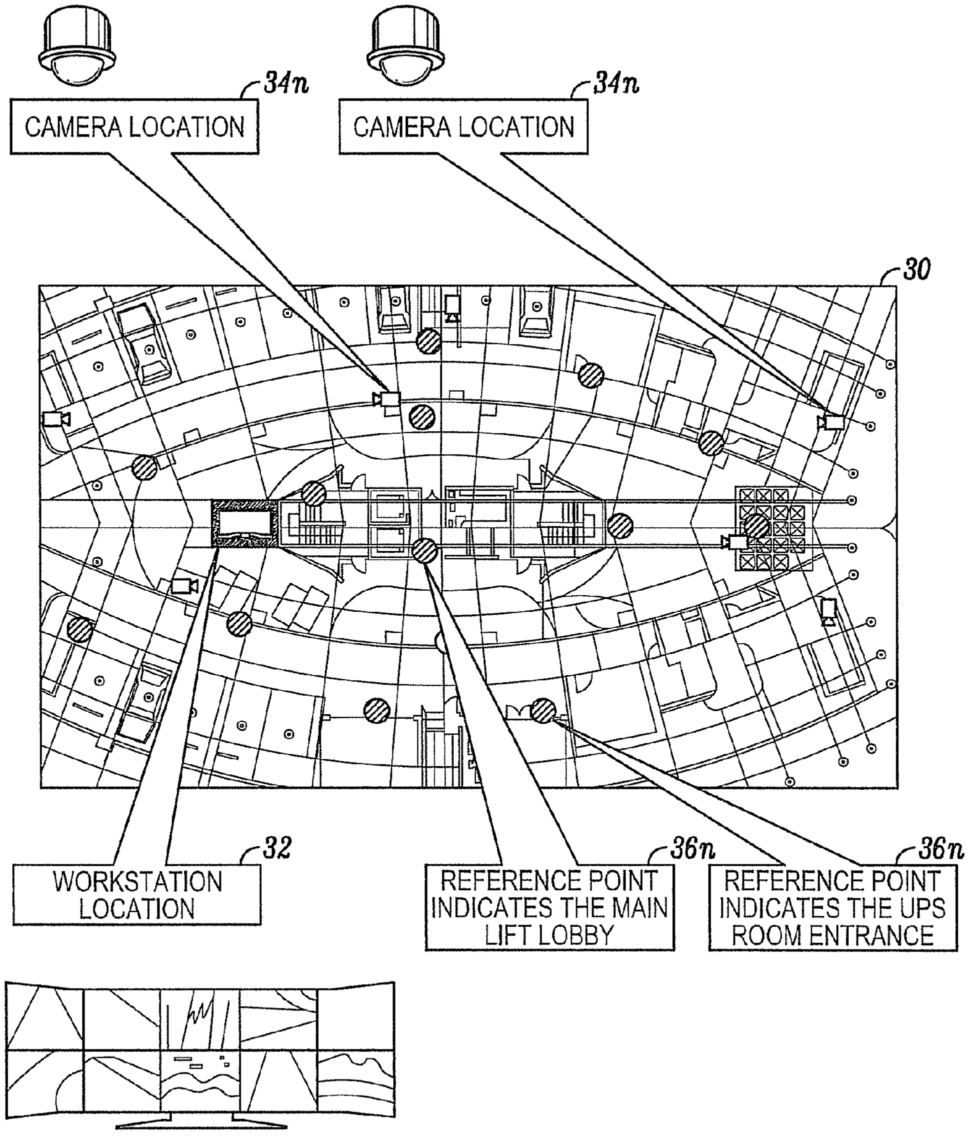
FIG. 6 is an interactive window displayed on a viewing screen of a graphical user interface for displaying a configured floor map in accordance with the present invention.

FIG. 6 is an interactive window 30 displayed on a viewing screen of a graphical user interface for displaying a configured floor map in accordance with the present invention. As seen in FIG. 6, the configured floor map can include the locations of a workstation location 32 and cameras 34*n* in the monitored area, as well as the locations of virtual reference points 36*n* on the floor map.

In embodiments of the present invention, the virtual reference points 36*n* can correspond to the locations of certain structures in the monitored area. For example, the virtual reference points 36*n* can correspond to the location of a main lobby elevator, and a mail room entrance.

In embodiments of the present invention, the workstation can include a plurality of viewing screens for displaying video associated with the various cameras in the area. An operator at the workstation can monitor the zones associated with the cameras by viewing the associated video at the workstation.

Figure 7:
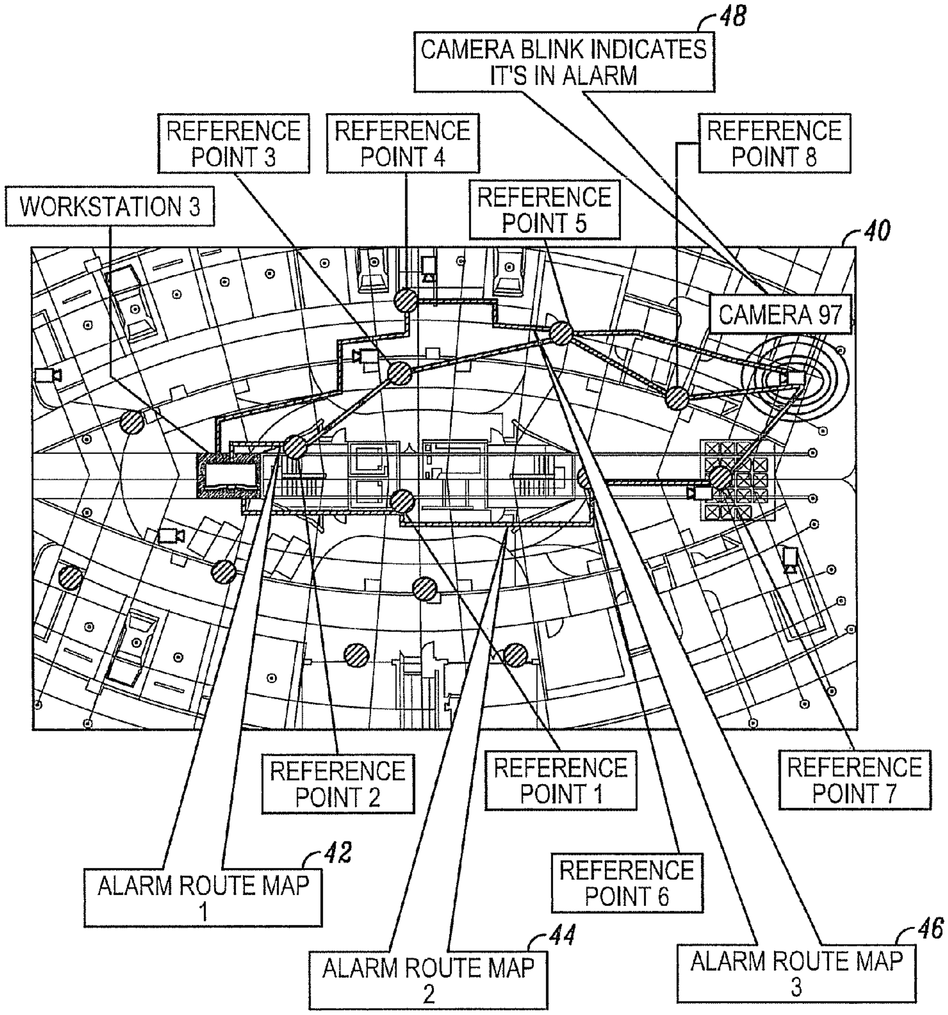
FIG. 7 is an interactive window displayed on a viewing screen of a graphical user interface for displaying an alarm route map on a floor map in accordance with the present invention.

FIG. 7 is an interactive window 40 displayed on a viewing screen of a graphical user interface for displaying an optimal guidance route map in accordance with the present invention. The optimal guidance route map can identify the location of a camera 48 in the monitored area that detects an alarm condition. For example, the route map can blink, flash, or highlight the pictorial representation of a camera detecting an alarm condition to identify to a user where an alarm condition is detected. As seen in FIG. 7, camera 97 detects an alarm condition.

The optimal guidance route map can identify a plurality of optimal routes from a workstation to the camera in alarm using location data of the virtual reference points on the floor map and the computed distances between the workstation and nearby virtual reference points, between the camera in alarm and nearby virtual reference points, and between each virtual reference point and the nearby virtual reference points. The best route can be highlighted on the optimal guidance route map for easy identification by a user.

For example, a first optimal route 42 can be computed from workstation 3 to camera 97 in alarm via virtual reference point 2, virtual reference point 3, virtual reference point 5, and virtual reference point 8. Similarly, a second optimal route 44 can be computed from workstation 3 to camera 97 in alarm via virtual reference point 4 and virtual reference point 5. A third optimal route 46 can be computed from workstation 3 to camera 97 in alarm via reference point 1, virtual reference point 6, and virtual reference point 7.

Systems and methods in accordance with the present invention can be employed in connection with access control systems, intrusion detection systems, and video management systems. However, systems and methods in accordance with the present invention are not so limited and can be used in connection with any systems as would be known and desired by those of ordinary skill in the art.

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the spirit and scope of the claims.

What is claimed is:

1. A method comprising:

a processor importing a floor map of a monitored area;

the processor identifying locations of a plurality of reference points on the floor map, a location of each reference point identified independent of any route map, independent of a location of any other reference point, and independent of data for traveling to or from the reference point;

after the locations of the plurality of reference points are identified, the processor determines a distance between each of the plurality of reference points along user-accessible paths on the floor map;

after the distance between each of the plurality of reference points is determined, the processor using the determined distances between each of the plurality of reference points to generate an optimal guidance route map that includes at least one route from a workstation to a designated device in the monitored area; and the processor displaying the optimal guidance route map on a user interface.

2. The method of claim 1 wherein the floor map is a picture, graphical representation, or CAD diagram of the monitored area.

3. The method of claim 1 wherein identifying the locations of the plurality of reference points on the floor map includes identifying locations of the workstation, a plurality of devices in the monitored area, and a plurality of virtual reference points on the floor map.

4. The method of claim 1 further comprising calibrating the floor map according to a calibration unit.

5. The method of claim 4 wherein determining the distance between each of the plurality of reference points includes receiving user input that identifies a line between two known points on the floor map, converting the line into a number of pixels, and converting the number of pixels into distance, according to the calibration unit.

6. The method of claim 5 further comprising computing distances between each of the plurality of reference points on the floor map according to the calibration unit.

7. The method of claim 1 wherein generating the optimal guidance route map includes using the determined distances between each of the plurality of reference points to determine the shortest computed distance from the workstation to the designated device in the monitored area.

8. The method of claim 1 wherein displaying the optimal guidance route map includes displaying a plurality of routes from the workstation to the designated device.

9. The method of claim 1 wherein the designated device is one of a camera, a recorder, a switcher, or an I/O device.

10. The method of claim 1 employed in connection with an access control system, an intrusion detection system, or a video management system.

11. An apparatus comprising:

hardware circuitry that imports a floor map of a monitored area;

hardware circuitry that identifies locations of a plurality of reference points on the floor map, a location of each reference point identified independent of any route map, independent of a location of any other reference point, and independent of data for traveling to or from the reference point;

hardware circuitry that, after the locations of the plurality of reference points are identified, determines a distance between each of the plurality of reference points along user-accessible paths on the floor map;

hardware circuitry that, after the distance between each of the plurality of reference points is determined, uses the determined distances between each of the plurality of reference points to generate an optimal guidance route map that includes at least one route from a first location to a second location, wherein the first and second locations are in the monitored area; and hardware circuitry that displays the optimal guidance route map on a user interface.

12. The apparatus as in claim 11 wherein the locations of at least some of the plurality of reference points include locations of cameras.

13. The apparatus of claim 11 wherein displaying the optimal guidance route map includes displaying a plurality of routes from the first location to the second location.

14. An apparatus comprising:

hardware circuitry configured to display a floor map of a monitored area;

hardware circuitry configured to identify and display locations of a plurality of reference points on the floor map, a location of each reference point identified independent of any route map, independent of a location of any other reference point, and independent of data for traveling to or from the reference point;

hardware circuitry configured to, after the locations of the plurality of reference points are identified, determine a distance between each of the plurality of reference points on the floor map along user-accessible paths on the floor map;

hardware circuitry configured to, after the distance between each of the plurality of reference points is determined, use the determined distances between each of the plurality of reference points to generate an optimal guidance route map that includes at least one route from a first location to a second location, wherein the first location and the second location are in the monitored area; and hardware circuitry configured to display the optimal guidance route map.

15. The apparatus of claim 14 wherein the hardware circuitry configured to display the floor map includes hardware circuitry to display locations of a workstation and a plurality of devices in the monitored area.

16. The apparatus of claim 15 further comprising hardware circuitry configured to identify a device in the plurality of devices when the device detects an alarm condition.

17. The apparatus of claim 14 further comprising hardware circuitry configured to display the optimal guidance route map on a workstation or hardware circuitry to transmit the optimal guidance route map to an email system or a multimedia messaging system.

18. The apparatus of claim 14 wherein the hardware circuitry configured to display the optimal guidance route map includes hardware circuitry to display a plurality of routes from the first location to the second location.

* * * * *